United States Patent
Chao et al.

(10) Patent No.: US 6,930,670 B2
(45) Date of Patent: Aug. 16, 2005

(54) COMPUTER PERIPHERAL INPUT SYSTEM WITH TWO INPUT TYPES AND METHOD OF DATA COMMUNICATION FOR THE SAME

(75) Inventors: Ching-Chuan Chao, Taipei (TW); Chung-Wen Hsu, Kaohsiung (TW)

(73) Assignee: Aiptek International Inc., Hsin-Chu (TW)

( * ) Notice: Subject to any disclaimer, the term of this patent is extended or adjusted under 35 U.S.C. 154(b) by 164 days.

(21) Appl. No.: 10/029,990
(22) Filed: Dec. 31, 2001

(65) Prior Publication Data
US 2003/0122786 A1 Jul. 3, 2003

(51) Int. Cl.[7] ............................................. G09G 5/00
(52) U.S. Cl. ..................................... 345/168; 345/173
(58) Field of Search ................................. 345/156–179; 178/18.01, 19.01

(56) References Cited

U.S. PATENT DOCUMENTS

| | | | | |
|---|---|---|---|---|
| 4,992,630 A | * | 2/1991 | Mletzko .................. | 178/19.04 |
| 5,111,005 A | * | 5/1992 | Smith et al. ............. | 178/18.01 |
| 5,148,155 A | * | 9/1992 | Martin et al. ............ | 345/173 |
| 5,329,625 A | * | 7/1994 | Kannan et al. ........... | 345/173 |
| 5,365,253 A | * | 11/1994 | Cheng et al. ............ | 345/156 |
| 5,525,981 A | * | 6/1996 | Abernethy ............... | 341/34 |
| 5,719,597 A | * | 2/1998 | Fong ...................... | 345/174 |
| 5,896,125 A | * | 4/1999 | Niedzwiecki ............ | 345/168 |
| 6,180,894 B1 | * | 1/2001 | Chao et al. ............. | 178/18.03 |
| 6,389,560 B1 | * | 5/2002 | Chew ..................... | 714/43 |
| 6,557,050 B1 | * | 4/2003 | Hamilton et al. ........ | 710/19 |
| 6,735,658 B1 | * | 5/2004 | Thornton ................ | 710/305 |
| 2002/0078283 A1 | * | 6/2002 | Purcell et al. .......... | 710/109 |

* cited by examiner

*Primary Examiner*—Regina Liang
(74) *Attorney, Agent, or Firm*—Rosenberg, Klein & Lee

(57) ABSTRACT

A computer peripheral input system with two input types and a method of data communication for the same is provided. The computer peripheral input system comprises a first input module, a second input module and control means having a communication interface installed therein. The first input module is used for inputting at least a first input data and generating a first input signal corresponding thereto. The second input module is used for inputting at least a second input data and generating a second input signal corresponding thereto. Control means reads and processes the first and second input signals, and then stores a first and second information respectively corresponding thereto. The first information represents the first input data. The second information represents the second input data. The communication interface sends the first and second information stored in control means by a polling method.

5 Claims, 2 Drawing Sheets

COMPUTER PERIPHERAL INPUT SYSTEM WITH TWO INPUT TYPES AND METHOD OF DATA COMMUNICATION FOR THE SAME

BACKGROUND OF THE INVENTION

1. Field of the Invention

The present invention relates to computer peripheral input devices, and more particularly to a computer peripheral input system with different input modules.

2. Description of the Prior Art

Driven both by the needs of users and the capabilities of various implementation technologies, computers and the way that people interact with them are redesigned again and again.

To make computer systems easier for people to use, various systems have included stylus-type input devices (typically used with a digitizer tablet). Because of their similarity to conventional writing implements, stylus-type devices are particularly well suited to be used for character input, among pointing devices, in addition to functioning as a pointing device. When used, stylus-type input devices have generally been provided in addition to a keyboard.

Keyboards, whether used for personal computers, calculators or toys, usually have a plurality of keys, which are arranged in a row-column matrix. Depression, or actuation, of a key within this matrix results the completion of a circuit, which connects one row to one column. Thus, the matrix can be scanned by feeding digital "1" (5 volts in TTL Logic) to every column and reading the output from the rows.

Drawing tablets, while long known in the computer field, have just recently become increasingly prevalent. A drawing tablet can be defined as a device comprised of an electromagnetic sensitive writing surface on which a person can position a hand-held stylus, and the position where the stylus touches is measured in two dimensions (x and y). The measured position is converted into an electrical digital code (i.e. encoded) in a conventional manner. The stylus may be a pen or any narrow object or instrument like a mouse, puck.

A kind of computer input device being able to provide input signals of a keyboard and a digitizer tablet has been developed. This prior computer input device is provided with a character code detection loop and a conducting trace detection loop within a keyboard device. Thus, the keyboard device can provide character code data and X-Y coordinate data to the computer, and improving graphic and handwriting functions of the computer. In this prior computer input device, two micro-controllers are employed to respectively process the character code input data and the X-Y coordinate input data received from the keyboard device, and then sending the character code data and the X-Y coordinate data, respectively through a keyboard communication interface and a digitizer tablet communication interface to the computer for further processing.

This prior computer input device utilizes two micro-controllers and two communication interfaces for respectively processing/communicating character codes and coordinate data. It is not economically effective whether in manufacturing technique or production cost. Accordingly, it is an intention to provide an improved computer input device, which not only increases functions of the computer but also more satisfies economic effectiveness.

SUMMARY OF THE INVENTION

It is one objective of the present invention to provide a computer peripheral input system with two input types, which is provided with a first input module and a second input module, and both of them are controlled by a micro-controller.

It is another objective of the present invention to provide a computer peripheral input system with two input types, which utilizes a keyboard and a digitizer tablet as input devices thereof and employs a micro-controller to read/process/store the input data of the keyboard and the digitizer tablet, and uses a universal serial bus (USB) interface to communicate the input data stored in the micro-controller.

It is a further objective of the present invention to provide a computer peripheral input system with two input types, which utilizes a universal serial bus interface (USB interface) to serve as a communication interface between a micro-controller and a computer host, and associating with an executing program installed in the micro-controller such that input data of a keyboard and a digitizer tablet can be sent to a computer host through an endpoint 1 of the universal serial bus interface.

In order to achieve the above objectives of this invention, the present invention provides a computer peripheral input system with two input types and method of data communication for the same. The present computer peripheral input system comprises a first input module, a second input module and control means having a communication interface installed therein. The first input module is used for inputting at least a first input data and generating a first input signal corresponding thereto. The second input module is used for inputting at least a second input data and generating a second input signal corresponding thereto. Control means reads and processes the first and second input signals, and then stores a first and second input information respectively corresponding thereto. The first information represents the first input data. The second information represents the second input data. The communication interface sends the first and second information stored in control means by a polling method.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE PREFERRED EMBODIMENTS

Figure 1:
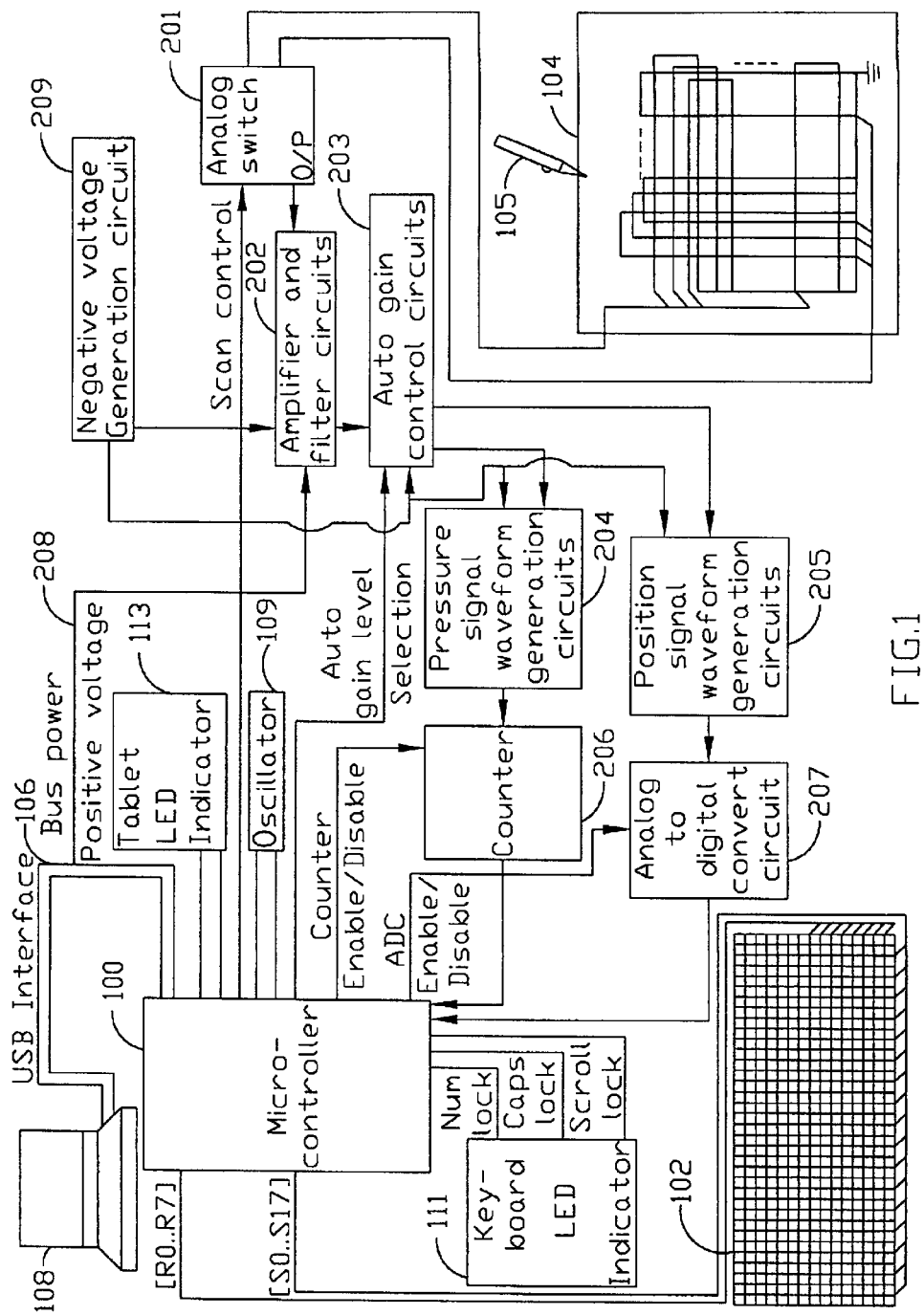
FIG. 1 is a block diagram of a preferred embodiment of the present invention.

The present computer peripheral input system with two input types mainly comprises a first input module, a second input module and control means having a communication interface installed therein. The first input module is used for inputting at least a first input data and generating a first input signal corresponding thereto. The second input module is used for inputting at least a second input data and generating a second input signal corresponding thereto. The control means is used for reading and processing the first input signal and the second input signal, and then storing a first and second information corresponding thereto. The first information represents the first input data and the second information represents the second input data. The communication interface is served for sending the first information and the second information stored in the control means to a computer host by a polling method.

According to one preferred embodiment of the present computer peripheral input system, a keyboard device 102 is used as the first input module and a digitizer tablet system is used as a second input module. The digitizer tablet system includes a digitizer tablet 104 and a plurality of pointing devices, such as cordless pen 105, cordless mouse (not shown) and a puck (not shown). The cordless pen 105 emits an electromagnetic field of a variable frequency and the cordless mouse emits an electromagnetic field of a different frequency. When the cordless pen 105 or the cordless mouse is placed in the working area of the digitizer tablet 104, conducting trace detection loops detect an inducing current. When a pointing device is placed on the working area and a button thereof is actuated, the conducting trace detection loops detect another inducing current having a frequency different from that of the inducing current mentioned-above. The present invention automatically discriminates the cordless pen 105 and the cordless mouse in accordance with a frequency section of an electromagnetic field, which induces a current to be detected.

In the preferred embodiment, a micro-controller 100 and a universal serial bus interface (USB interface) 106 are respectively served as the control means and the communication interface installed therein. The universal serial bus interface 106 is served as a message communication channel between the micro-controller 106 and the computer host 108, i.e. a command and data communication channel between them. An executing program installed in the micro-controller 100 controls reading and sending of input data of the keyboard device 102 and the digitizer tablet system. As a result, the keyboard device 102 and the digitizer tablet system can share the universal serial bus interface 106 merely having an endpoint 0 and an endpoint 1. The executing program is stored in a program memory of the micro-controller 100. The endpoint 0 of the universal serial bus 106 is used for receiving and sending data, and the endpoint 1 of the universal serial bus 106 is used for merely sending data. i.e. sending data from computer peripheral devices, such as keyboard and digitizer tablet, to the computer host 108. Hence, the input data of the keyboard device 102 and digitizer tablet system can be sent to the computer host 108 through the endpoint 1 of the universal serial bus interface 106, by running the executing program of the micro-controller 100. In this preferred embodiment, a data memory of the micro-controller 100 is planned to a plurality of predetermined memory regions for storing input data from different input devices. That is, the read input data of keyboard, cordless pen, cordless mouse and puck, are respectively stored in the predetermined memory regions corresponding thereto.

FIG. 1 is a block diagram of the preferred embodiment of the present invention. The process for reading an actuated key data of the keyboard device 102 is as follows: the micro-controller 100 directly scans a character code detection loop for scanning a key matrix of the keyboard device 102. When a key is pressed or actuated, the micro-controller 100 checks out a corresponding character code from a character code mapping table established therein in accordance with the order for scanning the key matrix of the keyboard device 102. Thereafter, the actuated key data is stored in a predetermined data memory region in the micro-controller 100 planned for the input data of the keyboard device 102. When the universal serial bus interface (USB interface) 106 polls input data stored in the micro-controller 100, the actuated key data is then sent to the computer host 108 through the endpoint 1 of the universal serial bus interface 106.

The process for reading input data of the digitizer tablet 104 is as follows: the micro-controller 100 and analog switches 201 work with each other to scan X-axis and Y-axis of the full range working area at each predetermined time slot according to the order of encoding circuit. By controlling these analog switches 201, the micro-controller 100 can scan the conducting trace detection loops from the initial loop to the end loop extending in X-direction and Y-direction by the means of time-sharing and multi-tasking. When the cordless pen 105 (or the cordless mouse or other pointing devices) is placed at a predetermined height level above the digitizer tablet 104, enabling the digitizer tablet 104 to sense the cordless pen 105, the cordless pen 105 emits an electromagnetic field toward the working area, emitting of the digitizer tablet 104. An inducing current is then generated on the pressed position of the working area. The inducing current is detected by scanning each conducting trace in the X-direction and the Y-direction. As a result, it is known that the cordless pen 105 (or the cordless mouse or other pointing devices) is placed in a predetermined area constituted by a certain X conducting trace and a certain Y conducting trace. Following, two left X conducting traces of the certain X conducting trace, two right X conducting traces of the certain X conducting trace and the certain X conducting trace are scanned so as to obtain their respective inducing currents. Two upper Y conducting traces of the certain Y conducting trace, two lower Y conducting traces of the certain Y conducting trace and the certain Y conducting trace are scanned so as to obtain their respective inducing currents. Each of the respective inducing currents is weak and needs to be amplified for enabling further processing. Hence, each respective inducing current is sent to amplifier and filter circuits 202. The filter circuit comprises a bandpass filter. The filter circuit is used to filter noises outside the frequency range of the electromagnetic field emitted from the cordless pen 105 (or the cordless mouse).

The output of the filter circuit is sent to two different paths. The first path includes pressure signal waveform generation circuits 204 and a counter 206. The output of the filter circuit is converted to a first digital signal through the pressure signal waveform generation circuits 204. The pressure signal waveform generation circuits 204 comprise a comparator circuit, which can convert the output of the filter circuit to a clock. The first digital signal is then sent to the counter 206 to determine the frequency. Alternately, a frequency counter can be established within the micro-controller 100 to omit an external circuit of the counter 206. The frequency characteristic of the first digital signal can determine whether the first digital signal comes from the cordless pen 105 or the cordless mouse. Simultaneously, it is discriminated if a key is actuated and which is the actuated key. After passing the counter 206, the first digital signal is sent to the micro-controller 100 and calculated using a conventional approach to generate a pressure data/or a button status data of the cordless pen 105 (or the cordless mouse). The pressure data/or the button status data is then stored in a predetermined data memory region in the micro-controller 100 planned for the input data of the cordless pen 105 (or the cordless mouse).

The output of the filter circuit is also sent to a second path. The second path includes position signal waveform generation circuits 205 and an analog to digital convert circuit 207. Alternately, an analog to digital convert circuit can be established within the micro-controller 100, and omitting the analog to digital convert circuit 207 externally connected thereto. The position signal waveform generation circuits 205 comprise a rectifier circuit and a peak detector circuit.

The output of the filter circuit passes through the rectifier circuit, becoming a DC signal. And, the peak value of the DC signal is obtained after passing through the peak detector circuit. The peak value is converted to a second digital signal through the analog to digital convert circuit 207, then is sent to the micro-controller 100. The second digital signals corresponding to the five respective X conducting traces are sent to the micro-controller 100, and calculated in accordance with a linear relationship to obtain an accurate X coordinate data. Similarly, the second digital signals corresponding to the five respective Y conducting traces sent to the micro-controller 100, and calculated in accordance with a linear relationship to obtain an accurate Y coordinate data. The X, Y coordinate data are stored in the predetermined data memory region in the micro-controller 100 planned for input data of the cordless pen 105 (or the cordless mouse). While, an actuated button status of the cordless pen 105 (or the cordless mouse or other pointing devices) is determined in accordance with a frequency of the maximum inducing current of the conducting trace corresponding to the actuated button. The frequency of the maximum inducing current is determined through the counter 206. The actuated button status is stored in a corresponding predetermined data memory region.

The pressure data/or button data and X-Y coordinate data are stored in the predetermined data memory region. When the universal serial bus interface 106 polls the stored input data of the digitizer tablet 104 in the micro-controller 100, the stored input data of the digitizer tablet 104 is sent to the computer host 108 through the endpoint 1 of the universal serial bus interface 106.

When the cordless pen 105 uses a battery cell as its power supply, the electric energy of the battery cell is gradually consumed as the usage time of the cordless pen 105 is increased. The intensity of the electromagnetic field emitted from the cordless pen 105 is also gradually weakened. Therefore, as being shown in FIG. 1, the output of the filter circuit can alternatively pass through auto gain control circuits 203 before sent to the two path, so as to automatically adjust the intensity of the input signal from the digitizer tablet 104.

Additionally, a bus power positive voltage 208 and a negative voltage generation circuit 209 can supply a positive voltage and a negative voltage to the amplifier circuit. An oscillator 109 is used as a timing pulse source. The microcontroller 100 also can be used to control a keyboard light emitting diode (LED) indicator 111 and a tablet light emitting diode (LED) indicator 113. The keyboard LED indicator 111 includes Num lock, Caps lock and Scroll lock buttons' LED indicators. The tablet LED indicator 113 can be used to show the status of the digitizer tablet 104. When the cordless pen 105 or the cordless mouse is placed upon the digitizer tablet 104, the tablet LED indicator 113 keeps light up. When a button of the cordless pen 105 or the cordless mouse is actuated, the tablet LED indicator 113 keeps light off. When the cordless pen 105 or the cordless mouse is undetected by the digitizer tablet 104, the tablet LED indicator 113 is flashed. While, the indication provided by the present invention is not limited by the above definition. The user can observe if the digitizer tablet 104 is in a normal status from the tablet LED indicator 113.

Figure 2:
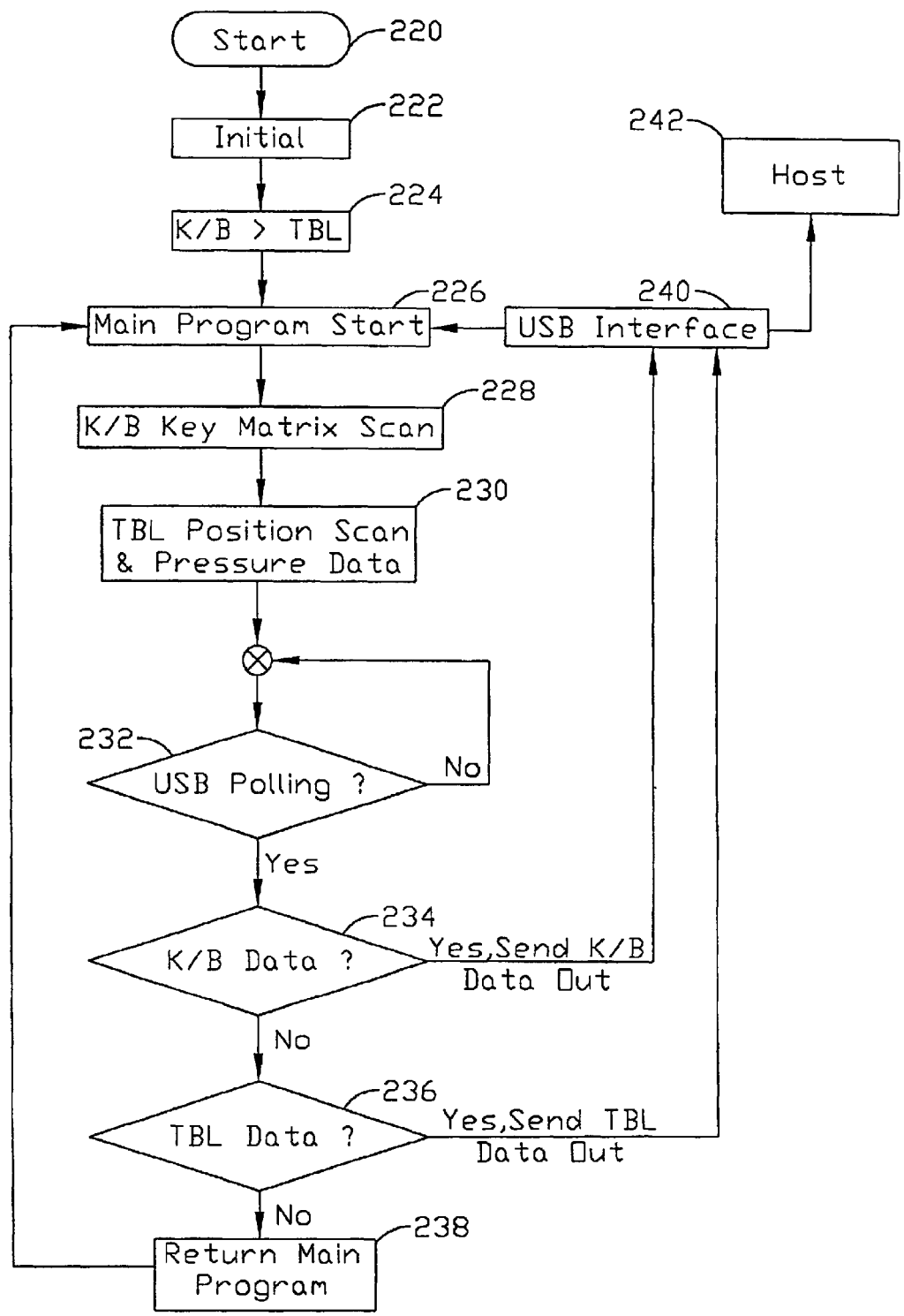
FIG. 2 is a flow chart for accessing input data of the preferred embodiment of FIG. 1.

FIG. 2 is a flow chart run by the executing program of the micro-controller 100 for reading/sending input data according to the preferred embodiment of the present invention. The universal serial bus interface (USB interface) 106 has a plug-and-play property and a function for automatic detection. Hence, when the present computer peripheral input system is turned on (step 220), the micro-controller 100 and the universal serial bus interface 106 immediately proceed handshaking. The executing program installed in the micro-controller 100 has provided a respective identifier (ID) for each input device, such as keyboard, cordless pen, cordless mouse and puck, in previously. During handshaking between the micro-controller 100 and the universal serial bus interface 106, the universal serial bus interface 106 obtains the respective identifiers (IDs) of the keyboard device 102, the cordless pen 105, the cordless mouse and the puck. The keyboard device 102 is considered as a function of the digitizer tablet 104 for inputting data, just like pointing devices, the cordless pen 105, the cordless mouse and the puck, by the universal serial bus interface 106. Thus, the keyboard device 102, the cordless pen 105, the cordless mouse and the puck can share an endpoint 1 of the universal serial bus interface 106. The universal serial bus interface 106 provides a respective output address of the endpoint 1 to each of the respective identifiers (IDs) of the keyboard device 102, the cordless pen 105, the cordless mouse and the puck. Therefore, the present computer peripheral input system does not occupy an additional endpoint 1 of the universal serial bus interface 106.

After completing the "start" procedure at step 220, entering step 222, clearing and planning the data memory of the micro-controller 100 to provide respective predetermined memory regions for storing input data corresponding to the respective identifiers. That is, providing a respective predetermined memory region for storing the read input data from one of the input devices, such as the keyboard device 102, the cordless pen 105, the cordless mouse and the puck.

Continuously, entering step 224, since the actuated key data of the keyboard device 102 cannot be lost, the executing program of the micro-controller preferably sets the actuated key data of the keyboard device 102 as a first priority reading/sending data.

After completing step 220, 222 and 224, starting a main program (step 226). Entering step 228, scanning the key matrix of the keyboard device 102 to detect the actuated key data and then storing the actuated key data in the respective predetermined memory region corresponding thereto. Entering step 230, scanning the conducting trace detection loop of the digitizer tablet 104 to capture the X-Y coordinate data and the pressure data/or the button status data as well as the corresponding respective identifier of the pointing device being used. Storing all those data in the respective predetermined memory region corresponding to the respective identifier.

Entering step 232, the universal serial bus interface 106 polls the micro-controller 100 concerning the stored input data according to the priority set in step 224. Entering step 234, if there is the actuated key data of the keyboard device 102 stored in the micro-controller 100, the actuated key data is sent to the computer host 108 (step 242) through the universal serial bus interface 106 (step 240), and returning to the steps 226 and 228 for reading another actuated key data of the keyboard device 102. If there is not actuated key data of the keyboard device 102 stored in the micro-controller 100, entering step 236 for polling input data of the digitizer tablet 104 stored in the micro-controller 100 according to the order of the respective identifiers of the pointing devices. If there is input data of the digitizer tablet 104 stored in the micro-controller 100, the input data including X-Y coordinate data and pressure data/or button status data are sent to the computer host 108 (step 242) through the universal serial bus interface 106 (step 240), and returning to steps 226 and 228 for reading another actuated key data of the keyboard device 102. If there is not input data of the digitizer tablet 104 stored in the micro-controller 100, entering steps 226 and 228 for reading another actuated key data of the keyboard device 102.

In accordance with the foregoing, the present invention utilizes a universal serial bus interface 106 as a communication/interface between the micro-controller 100 and the computer host 108 in the present computer peripheral input system, and associating with the executing program installed in the micro-controller 100 to enable the keyboard device 102 and the digitizer tablet 104 sharing the universal serial bus interface 106 merely having an endpoint 0 and an endpoint 1.

The preferred embodiment is only used to illustrate the present invention, not intended to limit the scope thereof. Many modifications of the embodiment can be made without departing from the spirit of the present invention.

What is claimed is:

1. A data communication method of a computer peripheral input system with two input types, said computer peripheral input system comprising a keyboard device, a digitizer tablet device including a plurality of pointing device and control means having a communication interface installed therein, said control means reading and processing input data of said keyboard device and said digitizer tablet device and storing them, the processed input data being sent to a computer host through said communication interface, said data communication method comprising:

proceeding handshaking action between said communication interface and said control means such that said communication interface detects respective identifier (ID) of said keyboard device and each of said pointing devices setting in said control means, and said communication interface providing a respective output address for each said respective identifier;

clearing and planning a data memory of said control means to provides a predetermined memory region in said data memory for storing input data corresponding to each said respective identifier (ID);

setting input data of said keyboard device as a first priority sent data of said communication/interface;

reading input data of said keyboard device and storing the input data in said corresponding predetermined memory region;

reading input data of said digitizer tablet device in sequence according to the order of said respective identifiers (ID) of said pointing devices and storing the input data in said predetermined memory regions corresponding to said respective identifiers of said pointing devices; and polling input data stored in said control means by said communication interface; when there is input data of said keyboard device stored in said control means, said communication interface sends the input data through said output address corresponding to said respective identifier (ID) of said keyboard device, and returning to the step of reading input data of said keyboard device; when there is not input data of said keyboard device stored in said control means, said communication interface polls input data of said digitizer tablet device, when there is input data of said digitizer tablet device stored in said control means, said communication interface sends the input data of said digitizer tablet through said output addresses corresponding said respective identifiers (ID) of said pointing device to the computer host according to the order of said respective identifiers of said pointing devices, and returning to the step of reading input data of said keyboard device, when there is not input data of said digitizer tablet device stored in said control means, returning to the step of reading input data of said keyboard device.

2. The data communication method of claim 1, wherein said pointing devices comprises a cordless pen, a cordless mouse and a puck.

3. The data communication method of claim 1, wherein said control means comprises a micro-controller.

4. The data communication method of claim 1, wherein said communication interface comprises a universal serial bus interface (USB interface).

5. The data communication method of claim 4, wherein said universal serial bus interface (USB interface) has an endpoint 0 and an endpoint 1.

* * * * *